US010924342B2

(12) United States Patent
Joshi et al.

(10) Patent No.: US 10,924,342 B2
(45) Date of Patent: Feb. 16, 2021

(54) SYSTEMS AND METHODS FOR ADAPTIVE INDUSTRIAL INTERNET OF THINGS (IIOT) EDGE PLATFORM

(71) Applicant: HONEYWELL INTERNATIONAL INC., Morris Plains, NJ (US)

(72) Inventors: Ramchandra Joshi, Montville, NJ (US); Kirupakar Janakiraman, Tamil Nadu (IN); GaneshKumar Nagaraj, Tamil Nadu (IN); Narayanan Srinivasan, Tamil Nadu (IN); Karthick Sengodan, Tamil Nadu (IN); Jim Darroch, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 90 days.

(21) Appl. No.: 15/971,140

(22) Filed: May 4, 2018

(65) Prior Publication Data

US 2019/0123959 A1     Apr. 25, 2019

Related U.S. Application Data

(60) Provisional application No. 62/576,214, filed on Oct. 24, 2017.

(51) Int. Cl.
*H04L 12/24* (2006.01)
*G05B 23/02* (2006.01)
(Continued)

(52) U.S. Cl.
CPC ...... *H04L 41/0816* (2013.01); *G05B 19/4183* (2013.01); *G05B 19/4185* (2013.01);
(Continued)

(58) Field of Classification Search
CPC ............. H04L 41/0813; H04L 41/0816; H04L 41/082; H04L 67/12; H04L 67/34;
(Continued)

(56) References Cited

U.S. PATENT DOCUMENTS

| 8,589,119 B2 * | 11/2013 | Comi ................... G06F 9/5066 702/188 |
| 10,255,043 B2 * | 4/2019 | Al-Fuqaha ............... G06F 8/34 |

(Continued)

FOREIGN PATENT DOCUMENTS

| WO | WO-2016089416 A1 * | 6/2016 | ............... G06F 8/65 |
| WO | 2017035536 A1 | 3/2017 | |

(Continued)

OTHER PUBLICATIONS

European Search Report dated Mar. 8, 2019 in corresponding European Application No. 18202174.1 (7 pages).

*Primary Examiner* — Asad M Nawaz
*Assistant Examiner* — Thomas R Cairns
(74) *Attorney, Agent, or Firm* — Bookoff McAndrews, PLLC

(57) ABSTRACT

Computer-implemented methods for configuring an Industrial Internet of Things (IIoT) edge node in an IIoT network to perform one or more functions, including: performing a situation analysis to determine a required change in one or more of an analytical model, a runtime component, and a functional block of the IIoT edge node based on a change in the one or more functions; and automatically provisioning a new or updated functional module to the IIoT edge node, based on the situation analysis, the new or updated functional module including one or more components, wherein each component includes at least one of a rules set, a complex domain expression with respect to a process industry, an analytical model, and a protocol decoder.

20 Claims, 8 Drawing Sheets

(51) Int. Cl.
*H04L 29/08* (2006.01)
*G05B 19/418* (2006.01)

(52) U.S. Cl.
CPC ..... *G05B 19/41845* (2013.01); *G05B 23/024* (2013.01); *G05B 23/0289* (2013.01); *H04L 67/12* (2013.01); *H04L 67/34* (2013.01)

(58) Field of Classification Search
CPC ... H04L 41/6712; H04L 41/34; G05B 19/418; G05B 19/4183; G05B 19/41845; G05B 19/4185; G05B 23/0224; G05B 23/024; G05B 23/0286; G05B 23/0289
See application file for complete search history.

(56) References Cited

U.S. PATENT DOCUMENTS

| | | |
|---|---|---|
| 2017/0060574 A1 | 3/2017 | Malladi et al. |
| 2017/0093982 A1 | 3/2017 | Shaashua et al. |
| 2017/0192414 A1 | 7/2017 | Mukkamala et al. |

FOREIGN PATENT DOCUMENTS

| | | |
|---|---|---|
| WO | 2018009159 A1 | 1/2018 |
| WO | 2018009160 A1 | 1/2018 |
| WO | 2018009205 A1 | 1/2018 |

* cited by examiner

SYSTEMS AND METHODS FOR ADAPTIVE INDUSTRIAL INTERNET OF THINGS (IIOT) EDGE PLATFORM

CROSS-REFERENCE TO RELATED APPLICATION(S)

This application claims the benefit of priority to U.S. Provisional Application No. 62/576,214, filed Oct. 24, 2017, which is incorporated herein by reference in its entirety.

TECHNICAL FIELD

Various embodiments of the present disclosure relate generally to Industrial Internet of Things (IIoT) systems and networks. More specifically, this disclosure relates to an adaptive edge platform for use in an IIoT system or network.

BACKGROUND

Industrial process control and automation systems are routinely used to automate large or complex industrial processes. These systems have evolved from closed proprietary systems in the early 1990s to more convenient, connected, and open systems now. The current trend involves (i) moving these systems to cloud computing environments and (ii) using Industrial Internet of things (IIoT) devices within these systems. In some conventional systems, IIoT Edge nodes are fixed and are not aware of their situation or the context in which they are used. As a result, as input data patterns change, software for the edge nodes often needs to be manually changed. This leads to inefficiency, substantial manual effort, high maintenance costs, and equipment down-time.

In today's internet of things (IoT) world, IoT providers direct their focus towards connecting devices, extracting data from those devices, and sending the data to the cloud for analytics. A few solutions are available for analytics capabilities at the edge node layers to address the problems of real time analytics in an industrial internet of things (IIoT) environment. However, solutions may incur heavy bandwidth utilization in sending data to the cloud for analytics.

Embodiments of the present disclosure provide context-based adaptive deployment of functionality, including analytics, in an IIoT edge node. One or more embodiments may add intelligence to the edge platform to possibly allow it to adapt to the environment in which it is operating or will be operating. Thus, the architecture of the edge node may be adaptable to the context of the environment where the system performs.

The present disclosure is directed to overcoming one or more of these above-referenced challenges.

SUMMARY OF THE DISCLOSURE

According to certain aspects of the disclosure, systems and methods are disclosed for configuring an Industrial Internet of Things (IIoT) edge node in an IIoT network to perform one or more functions.

In one embodiment, a computer-implemented method is disclosed for configuring an Industrial Internet of Things (IIoT) edge node in an IIoT network to perform one or more functions. The computer-implemented method includes: performing situation analysis to determine a required change in an analytical model, runtime components, and functional blocks for the IIoT edge node based on a change in the one or more functions; and automatically provisioning new or updated edge container to the IIoT edge node, based on a context, where the new or updated edge container includes one or more micro containers or components, wherein each micro container includes at least one of a rules set, complex domain expressions with respect to a process industry, analytical models, and protocol decoders.

In accordance with another embodiment, a system is disclosed for configuring an Industrial Internet of Things (IIoT) edge node in an IIoT network to perform one or more functions. The system comprises: performing situation analysis to determine a required change in an analytical model, runtime components, and functional blocks for the IIoT edge node based on a change in the one or more functions; and automatically provisioning new or updated edge container to the IIoT edge node, based on a context, where the new or updated edge container includes one or more micro containers or components, wherein each micro container includes at least one of a rules set, complex domain expressions with respect to a process industry, analytical models, and protocol decoders.

In accordance with another embodiment, a non-transitory computer-readable medium is disclosed for configuring an Industrial Internet of Things (IIoT) edge node in an IIoT network to perform one or more functions. The non-transitory, tangible computer readable medium having instructions stored thereon that, in response to instructions by a computer-based system, cause the computer-based system to perform operations comprising: performing situation analysis to determine a required change in an analytical model, runtime components, and functional blocks for the IIoT Edge node based on a change in the one or more functions; and automatically provisioning new or updated edge container to the IIoT edge node, based on a context, where the new or updated edge container includes one or more micro containers or components, wherein each micro container includes at least one of a rules set, complex domain expressions with respect to a process industry, analytical models, and protocol decoders.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description.

As described above, there is a need in the field of industrial processes for systems and methods for configuring an Industrial Internet of Things (IIoT) Edge node in an IIoT network via the cloud. The following systems and methods provide more precise insight into processes and components that aid in the implementation of an adaptable edge platform.

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
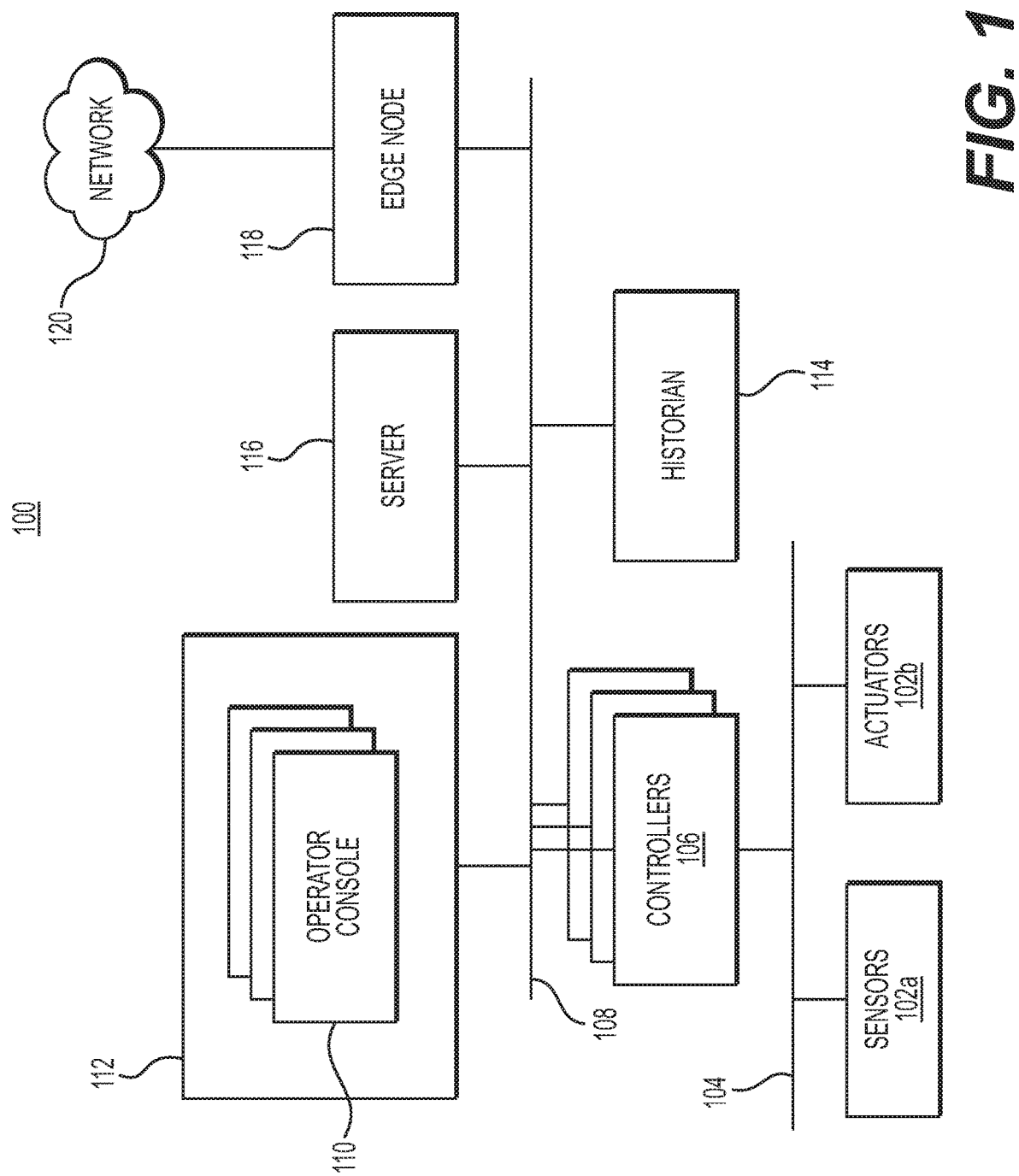
FIG. 1 illustrates an example industrial process control and automation system, according to one or more embodiments.

FIG. 1 illustrates an example industrial process control and automation system 100, according to one or more embodiments. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as flow, pressure, or temperature. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s). In accordance with this disclosure, the network 104 could represent all or a portion of a network of Industrial Internet of Things (IIoT) devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

In one embodiment, at least one network 108 couples the controllers 106 and other devices in the system 100. The network 108 facilitates the transport of information between components. The network 108 could represent any suitable network or combination of networks. As particular examples, the network 108 could represent at least one Ethernet network. In accordance with this disclosure, the network 108 could represent all or a portion of a network of IIoT devices. In one embodiment, network 104 and/or network 108 form part of the same network, such as network 120, which may be referred to as "the cloud," which may or may not form part of and/or be in communication with the Internet.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could request information affecting how the industrial process is controlled, such as by requesting setpoints or control modes for process variables controlled by the controllers 106 or other information that alters or affects how the controllers 106 control the industrial process. This could include requesting this information from the controllers 106 or from other devices such as historian 114 or servers 116. In response to such requests, each operator console 110 could receive the requested information. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud or a remote server communicatively coupled to the control and automation system 100.

At least one component of the system 100 could support an adaptive edge platform for use in an IIoT system or network. For example, this functionality could be implemented in an operator console 110, a server 116, or an edge node 118 coupled to an external source of information, e.g., network 120. In accordance with this disclosure, such an adaptive edge platform can be used to automatically update the firmware of devices based on a changing context in the system. This represents a technical advantage over other systems that do not automatically update firmware of devices.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where an adaptive edge platform can be used. This functionality can be used in any other suitable system.

Figure 2:
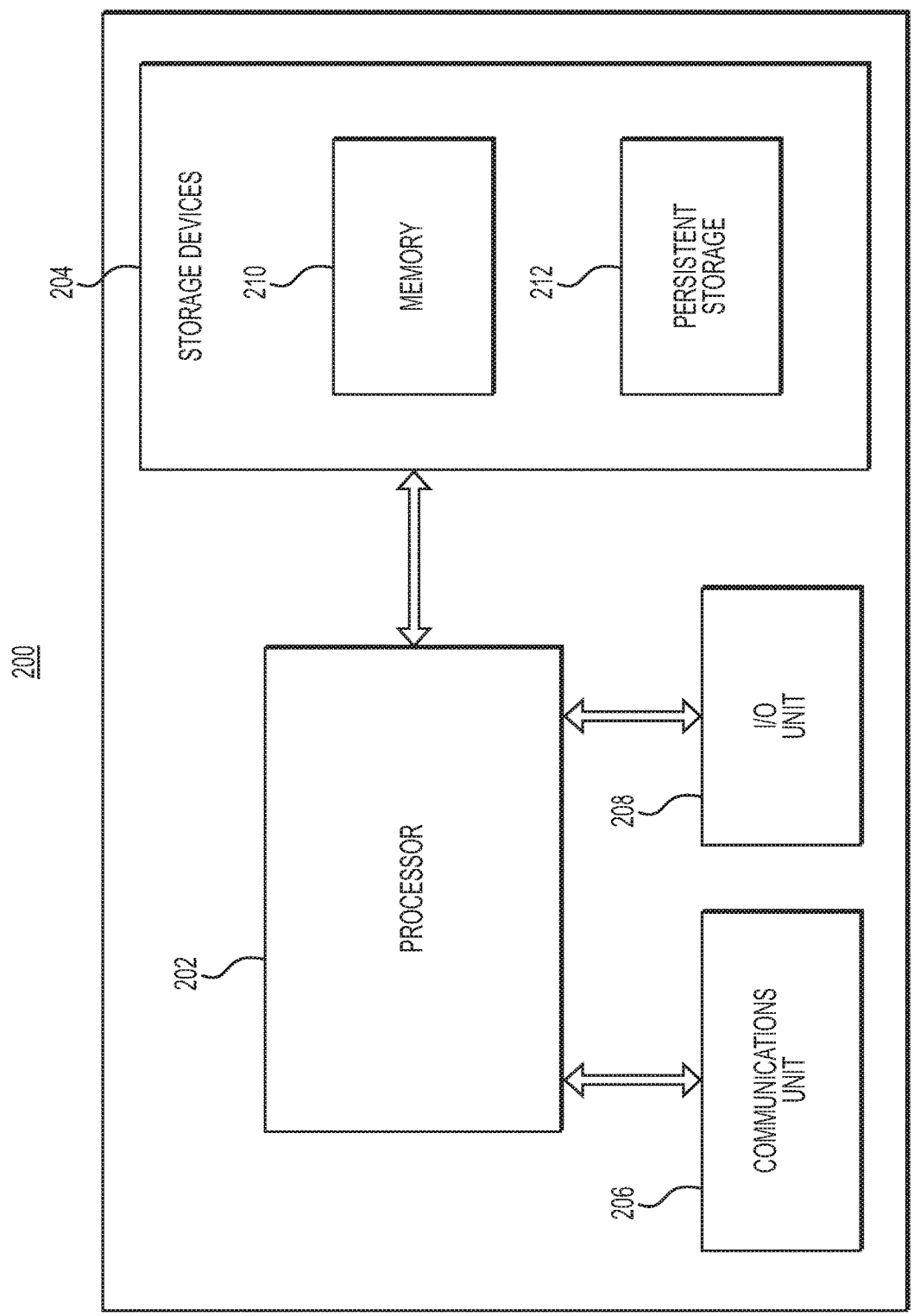
FIG. 2 illustrates an example device supporting an adaptive edge platform for use in an Industrial Internet of things (IIoT) system or network, according to one or more embodiments.

FIG. 2 illustrates an example device 200 supporting an adaptive edge platform for use in an IIoT system or network, according to one or more embodiments. The device 200 could, for example, denote an operator console 110, server 116, or edge node 118 described above with respect to FIG. 1. However, the device 200 could be used in any other suitable system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could be associated with a process supporting an adaptive edge platform for use in an IIoT system or network. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 supporting an adaptive edge platform for use in an IIoT system or network, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

According to one or more embodiments, an edge node, e.g. whether or not embodied as a device 200, may receive incoming data streams from a plurality of devices, such as sensors 102 and gateway servers 116, depicted in FIGS. 1 and 2. Each incoming data stream may be, for example, a stochastic process (i.e., a function of time), which may be exponentially distributed as explained below.

In one embodiment, of data receipt at device 200, a data inter arrival time for each sample s may consist of independent and identically distributed (IID) random variables and may be exponentially distributed. The number of data arrivals n over a given interval (t, t+1, t+2) may have a Poisson distribution. Thus, the incoming data arrival may be a Poisson process or a Poisson stream. If the arrival of the data stream to a single gateway with exponential service time are Poisson with a mean rate λ, the departures are also Poisson with the same rate λ, provided λ<μ, where μ is the mean service rate per gateway and λ is the mean arrival rate of data stream.

According to queueing theory the service times for the incoming Poisson events will also be independently and identically distributed (IIDs) random variables. Hence, it may be complex to pre-define the system's behavior over various circumstances since the arrival rate and service rate cannot be predicted accurately.

From the IIoT edge context, a demand response can be defined as dynamic scaling or modification of the application behavior based upon events. These events can include, for example, incoming sensor data, device flow control rate, resource utilization, performance implications, etc.

Since the data arrival rate is highly stochastic in nature, it can be very difficult to define a static behavior model for these attributes. In conventional systems, there may be very limited or no intelligence available at the edge node to understand the demand response of the system and to modify the application behavior accordingly, and there may further be application scalability problems.

A conventional IIoT edge node may include a complex event processing (CEP) engine and a rules engine to operate on an incoming data stream. Such an edge infrastructure may operate based upon a set of pre-defined rules or rule sets. In typical systems, there is no intelligence available to autonomously create new rules, modify rules, merge and/or concatenate rules, autonomously evolve rules, and so on. However, as discussed above, a self-learning capability may be used on the edge infrastructure to change the data interpretation logic dynamically.

In typical systems, the analytics algorithms present in the edge nodes may include the characteristics, such as statically-built models, which are deployed or downloaded once, atomic time complexity for all kinds of ecosystems, limited availability of information related to data driven contexts, hypotheses that cannot be modified based upon discrete events or spatial elements. Thus, there may be very little or no intelligence available in the edge node to modify, translate, or select these algorithms based upon the time series data or spatial element factors. This may lead to an increase in complexity of the edge node or an inability to perform certain functions, which may become an overhead issue for typical applications.

Another issue in the development and deployment of IIoT edge nodes is a tradeoff between the size and capability of an edge node. A typical edge or gateway node can often be classified as one of the categories below based upon size factors, as shown in Table 1.

TABLE 1

Node Classifications

| Category | CPU | Power [Watts] | Memory |
| --- | --- | --- | --- |
| Tiny | 100 MHz MICR | <1 | 1024 KB |
| Small | <1 GHz Single Core | <10 | 512 MB |
| Medium | <1 GHz Multicore | <100 | >8 GB |
| Large | >1 GHz Multicore | >500 | >32 GB |

Note that these values are examples only and therefore non-limiting. Due to diversified physical classifications of the nodes, limitations may arise for executing versatile types of tasks, such as, for example, ability to perform multiple complex tasks concurrently restrained by hardware profiles, pure wastage of resources by not identifying the required critical to quality (CTQ) of functionality in a given context, a static application architecture may not be possible across these physical classifications, in the case of low footprint systems, complex modules may impact the reliability of the application, and limitations caused by asynchronous behavior of the applications.

Hence, in the case of a small category of edge nodes, achieving the results of medium/large sized nodes is a challenge, and there is no kind of intelligence presently available in the edge layer for this type of transition. Overall, there is very limited or no context analyzing capability available in the edge node to address the above mentioned functional/behavior aspects.

Figure 3:
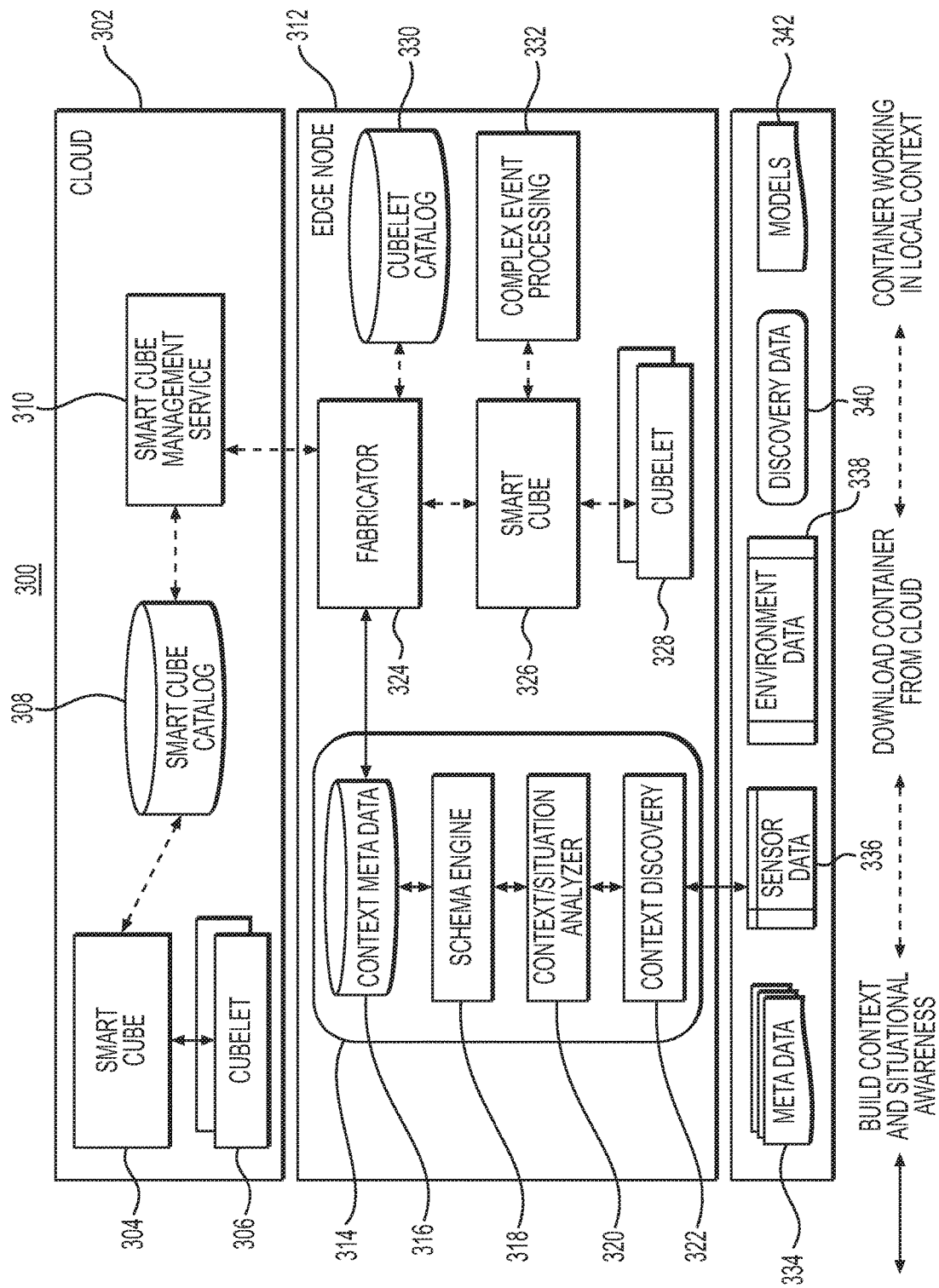
FIG. 3 illustrates an adaptable edge architecture environment for supporting an edge platform, according to one or more embodiments.

Thus, consistent with the embodiments of the present disclosure, FIG. 3 illustrates an adaptable edge architecture environment 300 for supporting an edge platform, according to one or more embodiments.

As shown in FIG. 3, the adaptable edge architecture includes data layer (comprised of meta data 334, sensor data 336, environment data 338, discovery data, 340 and model (s) 342); an edge node 312 layer and a cloud 302 layer. The data layer includes discovering devices (not illustrated) and obtaining data related to meta data 334 available on a device, sensor data 336 from the sensors attached to the device, environment data 338, discovery data from the industrial environment 340, and insights from the models 342 running in the device. The event processor 314 receives the aforementioned data via a context discovery 322 module, which then feeds the data to a context/situation analyzer 320. The context/situation analyzer 320 detects and analyzes the environment the data originated from. The schema engine 318 may obtain the analyzed data from the context/situation analyzer 320 and decode the data in order to further perceive the data and the elements of the environment derived from the data, comprehend the significance of the data and run the data through algorithms in order to train the data. The results of the schema analyzer are then stored in the context meta data 316. The fabricator 324 may then read the data stored in the context meta data 316 and then discover what containers are available through the container management service 310 in the cloud 302.

As shown in FIG. 3, one or more embodiments may include, among other components, a context/situation analyzer 320 to perform situation analysis to identify the metadata of the system context, such as in the form of a regular expression. The regular expression may be in the form of, for example, any type of desired IoT or IIot domain language, such as Honeywell International's Sentience Domain Language (SDL) or Edge Context Language (ECL). However, other forms of regular expressions may be used. In one embodiment, the system of FIG. 3 may include a component referred to as "smart cube," which may be a container that has smaller entities called "cubelets," which can be of any arbitrary type, with a single hypothesis or functional responsibility. The overall solution architecture for the smart cube-based adaptive edge platform is described below.

For example, the container management service 310 may communicate with the smart cube catalog 308, which lists the available smart cube(s) 304 and cubelet(s) 306. After discovering that the required container is available, the fabricator 324 requests a specific smart cube 304 and a specific set of cubelets 306 to be downloaded in the edge node 302. The fabricator 324 updates the cubelet catalog 330 in the edge node 312 indicating that the required container is now in the edge node 312. The smart cube 304 and associated cubelets 306 contain the logic for complex event processing and the instructions to provide the event processing service.

The aforementioned adaptable edge architecture environment 300 may be able to adapt logic behavior on demand. The edge node 312 layer may receive incoming data streams from a plurality of devices such as, sensors, gateways and actuators. From a machine learning perspective, the process of receiving data packets from those components, can be interpreted as a function of time, which is exponentially distributed as explained below.

In one embodiment, data inter arrival times=IID (Independent and Identically Distributed Random Variables) and exponentially distributed, where the number of data arrivals n over a given interval (t, t+1,t+2) has a Poisson distribution. Incoming Data arrival is a Poisson process or a Poisson stream.

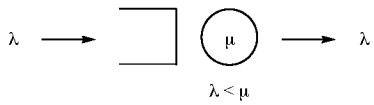

If the arrival of data stream to a single gateway with exponential service time are Poisson with mean rate λ, the departures are also Poisson with the same rate λ provided λ<μ

$$\lambda \longrightarrow \square \; (\mu) \longrightarrow \lambda$$
$$\lambda < \mu$$

μ=Mean service rate per gateway
λ=Mean arrival rate of data stream

According to queueing theory, and as per the representation in the above mentioned diagram the service times for the incoming Poisson events will be also independently and identically distributed (IIDs) random variables. Hence it becomes complex to pre define the systems behavior over various circumstances since the arrival rate and service rate cannot be predicted accurately.

From the IIoT edge context the demand response can be defined as, dynamic scaling or modification of the application behavior based upon certain events. These events can be:

Incoming Sensor data
Device Flow control rate
Resource Utilization
Performance implications and so on Since the data arrival rate is highly stochastic in nature it is very hard to define a static behavior model for these attributes. Currently there is very limited or no intelligence available at the edge to understand the demand response of the system and modify the application behavior according to that. It also includes the application scalability problems.

The adaptable edge architecture environment 300 may additionally leverage any type of desired IoT or IIot domain language (such as Honeywell International's Sentience Domain Language ("SDL")) capable of interpreting the key attributes of various representing a particular system (e.g. contexts), which can be decoded by the IoT application, which once deployed, will allow the adaptable edge architecture to become situation aware.

In one embodiment, the desired IoT or IIot domain language (e.g., SDL) may be interconnected across multiple networks in order to process and make decisions regarding data from various sector such as, connected buildings, connected offices, connected freight, connected aerospace and connected homes. Some of the aspects of the SDL expression may be: Lambda based notations to carry the pay load of more than one or group of meta data information. Typically, a lambda expression is an anonymous function that we can use to create delegates or expression tree types; encoded/cryptic in a form that only a smart application can decode the expression; SDL expressions are translative (i.e., arithmetic operations); SDL expressions can be given as input factors for a training set to generate a hypothesis based upon that, this training can happen either in the edge or in the cloud.

Figure 4:
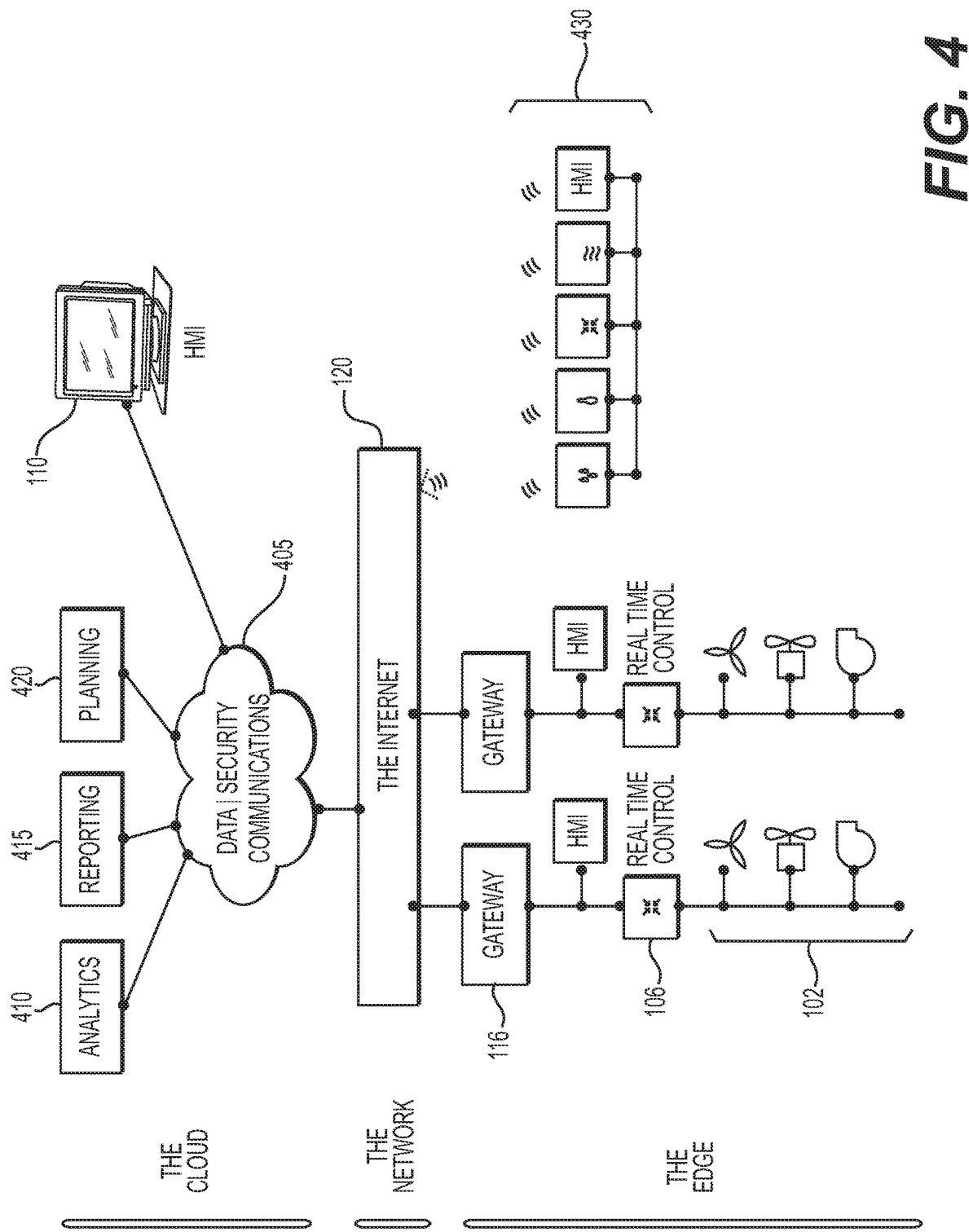
FIG. 4 illustrates components of an industrial internet of things (IIoT) environment, according to one or more embodiments.

FIG. 4 illustrates components of an industrial internet of things (IIoT) environment, according to one or more embodiments. As shown in FIG. 4, an IIoT environment may be organized in three primary layers (Cloud, Network, and the Edge). As shown in FIG. 4, the edge layer may include one or more sensors, actuators, or other devices 102, real time controllers 106, gateways 116, and a human-machine interface 110. Real time controllers 106 may control one or more smart network ready devices 430. The network layer may include any suitable wired or wireless network, such as, for example, a local area network (LAN), wide area network (WAN), Ethernet, wireless fidelity (WiFi), IEEE 802.11, Bluetooth or other short-range radio communication, near field communication, etc. The cloud layer may include data and security communications modules 405, modules for analytics (410), reporting (415), and planning (420), and a human machine interface 110.

The edge node may be, according to one or more embodiments, an embedded system having a low level of processing power, or a server class system having a high level of processing power. However, any suitable hardware may be employed according to the desired level of processing power, memory, storage, communications, size, power consumption, etc. As shown in FIG. 2, the edge node infrastructure may include a Central Processing Unit (CPU) 202, memory 210, storage 212, network connection(s) 206 to a communications network, such as, for example, the cloud, and connection(s) to controllers, devices and sensors by way of an I/O unit 208. The edge node may run command and control applications, stream and batch analytics, and send device-generated telemetry data to the cloud. Similarly, data originating in the cloud may be sent to devices through the edge platform. The edge node may be a secure computing environment that can encrypt data at rest and data in transit.

Figure 5:
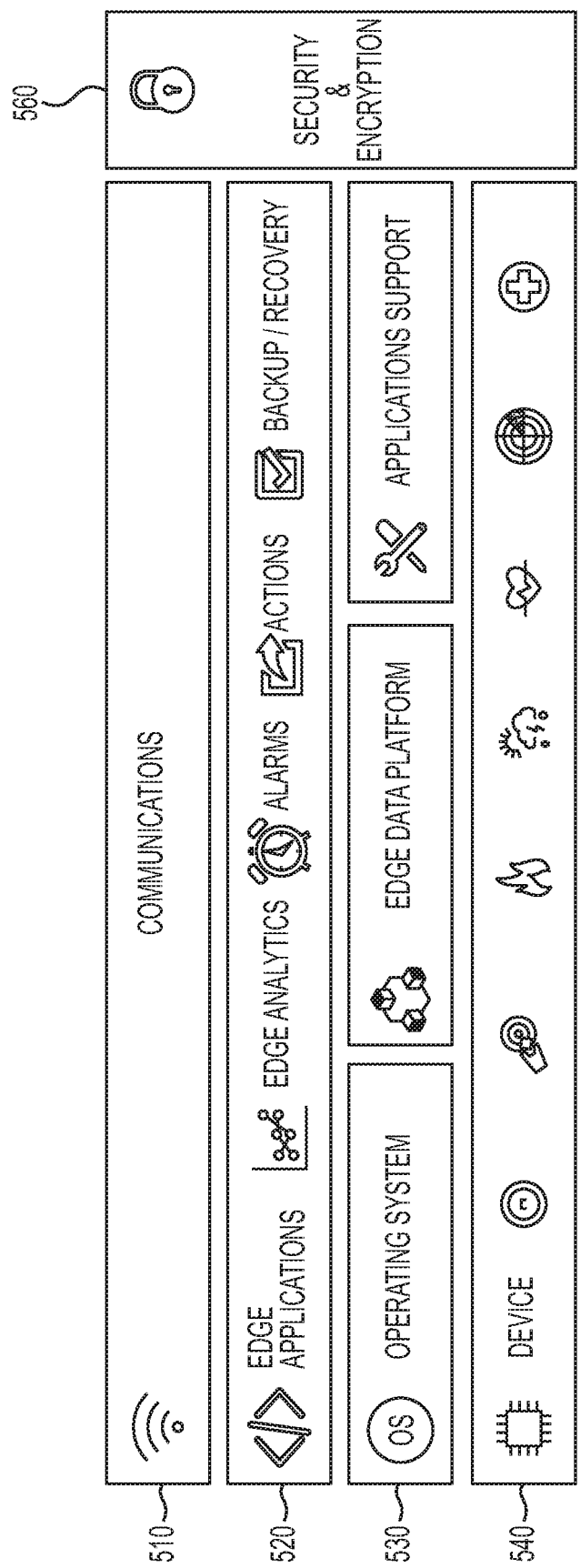
FIG. 5 illustrates an exemplary platform of device thru communications architecture layers of an industrial internet of things (IIoT) environment, according to one or more embodiments.

As shown in FIG. 5, the edge node IIoT platform may general include multiple layers, including a communications layer 510, an applications layer 520, an operating system layer 530, and devices interface layer 540. Security and encryptions layer 560 may extend among and between the plurality of layers of the edge node IIoT platform.

In one embodiment, the edge node software may include an operating system 530, a data storage and management platform, application support, a security and encryption module 560, a communications module 510, and interfaces 540 for one or more connected devices. The edge node may contain a pre-determined set of applications 520, such as analytics, alarm management, and backup/recovery. Typically, a configuration of which devices will connect to the node may be planned before deploying an edge node.

Devices may connect to the edge node using protocols such as ZigBee, Z-Wave, BLE, OPC UA, BACNet, and the like.

Figure 6:
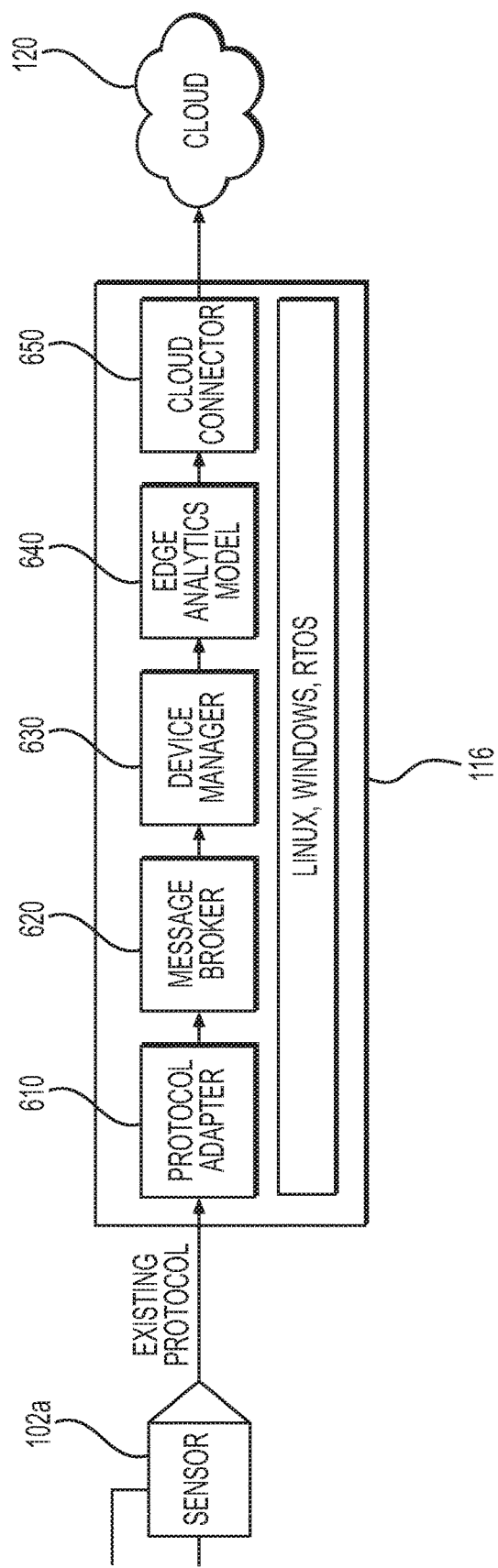
FIG. 6 illustrates an exemplary architecture between a plurality of sensors, a server, and the cloud of an industrial internet of things (IIoT) platform, according to one or more embodiments.

As shown in FIG. 6, an IIoT server 116 or edge node 118 may include functional modules such as, for example, a protocol adapter 610, a message broker 620, a device manager 630, an analytics model 640, and a cloud connector 650. These functional modules may be connected by a service bus (not shown), and further provided in communications between a plurality of sensors (e.g., one or more sensors 102a and the cloud 120.

In existing systems, behavioral aspects of these modules, such as those listed below, may be totally static. That is, the physical organization and bindings of the modules, the interaction between the modules, data communication between the modules, resource consumption of the modules, etc., may not be available for modification after deployment of the edge node. In other words, the modules may typically be tightly coupled and packaged for a common deployment scenario. There may be no intelligent mechanism available to re-organize, re-order, or re-couple these functional modules to adapt to the dynamic needs raised by a situation in the field. That may mean that the architecture may be unable to quickly adapt to changes in the local situation at the edge node.

Situation awareness or context awareness can be defined as "the perception of the elements in the environment within a volume of time and space, the comprehension of their meaning and the projection of their status in the near future." There are various kinds of data that an edge node can receive, such as:

Discrete events, e.g., including any event that occurs at time t1 and t2 such that there are two separate event instances, e.g., a door opens, lights turn on, etc.; and Continuous events, e.g., including any event instance lasting for a time duration p, where an event occurring at time t and t+p cannot be considered as two separate events, e.g., raining, having a shower, driving a car, etc.

Thus, the situation analyzer can operate on both discrete and continuous events with a two-step execution process to arrive at the system context. The situation analysis can occur based on demand or on a periodic interval. The situation analyzer in the edge node can correlate attributes, such as those below, along with original data to arrive at a context. The context includes:

Subsystem information/parameters: Subsystem parameters, such as point detail information, metadata of the operational context, deployed components, resource profiles, and the like.

Supersystem information: Environment parameters such as deployment context, execution environment, neighbor components, and other external parameters information.

Ontology information/asset model: Domain-related asset model information, including domain ontology data/metadata, ontology standards such as industry foundation classes/building information model (BIM) database schemas.

Figure 7:
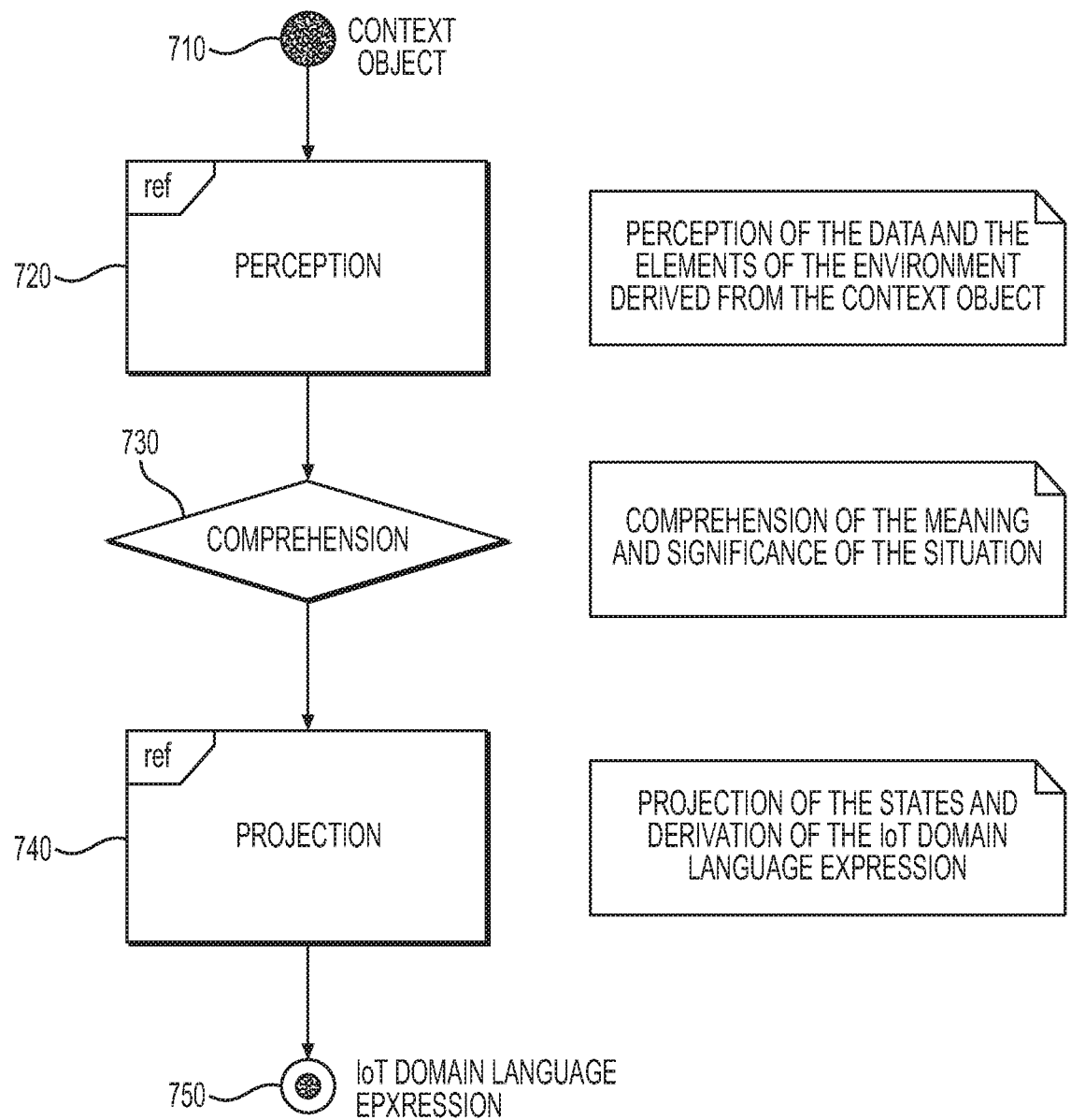
FIG. 7 illustrates a flow chart of an exemplary method of perception, comprehension, and projection between states of an IIoT domain language, according to one or more embodiments.

Performance data: Performance profiling information, such as memory/CPU footprint, Internet requirements, and other similar resource utilization information Data-driven context change information: A set of rules that impacts the system context based upon the complex events that were received by the system under consideration FIG. 7 depicts a method for derivation of an IoT domain language (e.g., a Sentience Domain Language ("SDL")) expression. It should be appreciated that although the present specification and drawings describe the SDL domain language, any IoT domain language and associated expression is contemplated within the scope of the present application and claims. In one embodiment, the IoT expression or SDL expression is a regular expression that includes attributes representing the system context, which can be decoded by an IoT platform edge smart cube to become situation-aware. Any IoT domain language (e.g., a Sentience Domain Language ("SDL")) may include core context objects in different fields, such as:

Connected buildings domain aspects
Connected workers domain aspects
Connected freight
Connected aero domain aspects
Connected homes domain aspects Based upon the context object that has been derived from the above mentioned parameters, there is a three-step process that can be performed towards refining the IoT domain language (e.g., SDL) expression.

Some aspects of the IoT domain language (e.g., SDL) expression include:

Lambda-based notations to carry the payload of more than one or group of metadata information. Typically, a lambda expression is an anonymous function that can be used to create delegates or expression tree types.

Encoded/cryptic in a form that only a smart cube can decode the expression.

IoT domain language (e.g., SDL) expressions are translative, i.e., arithmetic operations can be performed between them.

IoT domain language (e.g., SDL) expressions can be given as input factors for a training set to generate a hypothesis based thereupon. This training can happen either in the edge or in the cloud.

Figure 8:
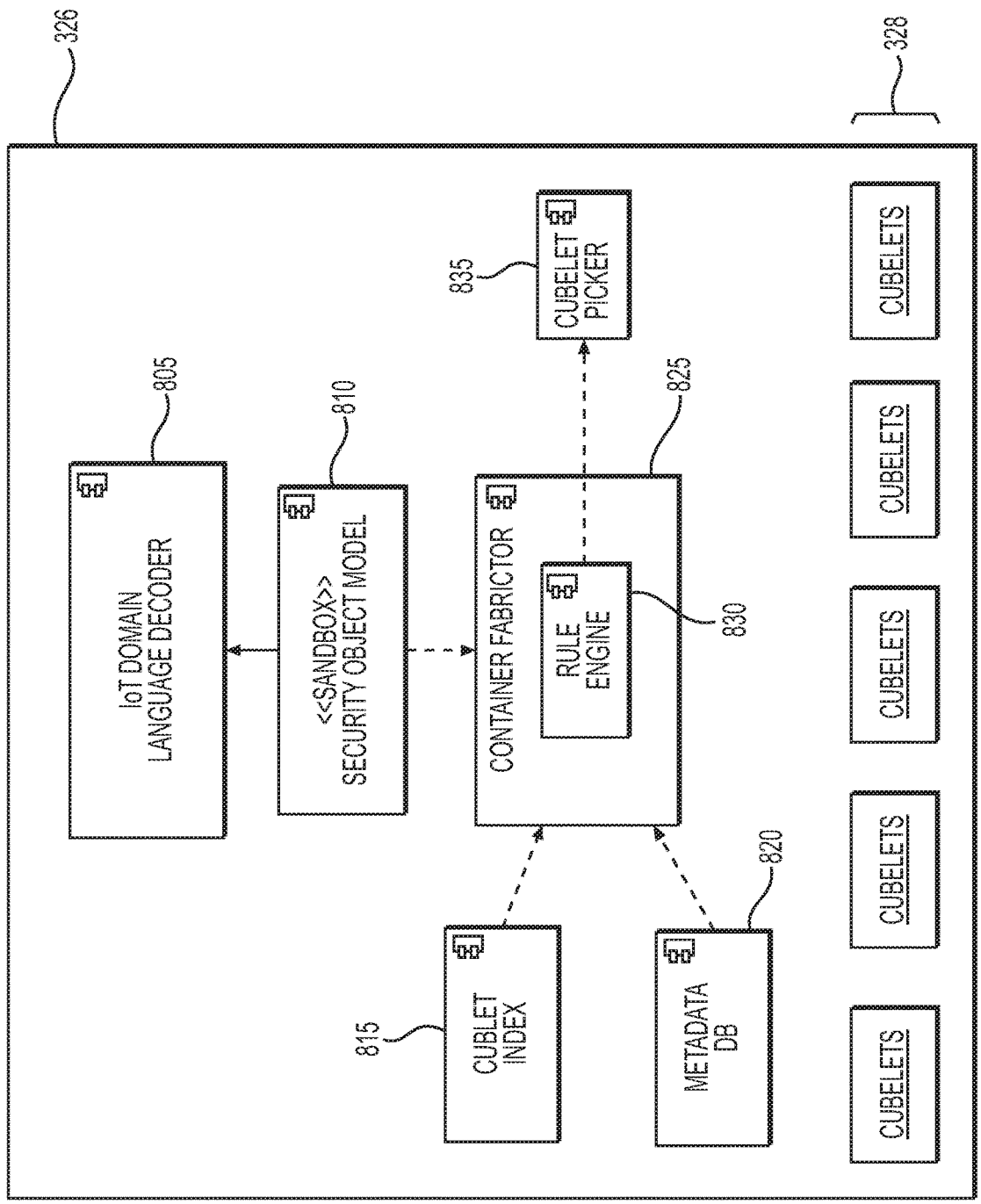
FIG. 8 illustrates a block diagram of an exemplary IIoT system for decoding and implementing IIoT domain languages and rules, according to one or more embodiments.

FIG. 8 depicts a smart cube as an enabler. Specifically, as described above, one entity in the proposed solution architecture is a smart cube, which is described below. Example smart cube features include, but are not limited to:

smart cube contains a standard directory structure, such as metadata (describing what the smart cube contains), executable code, configuration, etc.

smart cube may contain one or more cubelets.

cubelet is a replaceable component within a smart cube that can be turned on or off.

Additional cubelets can be downloaded from the cloud on demand.

A smart cube may run including IoT edge and cloud.

In one embodiment, a cubelet can be defined as an autonomous entity capable of having the following features:

Input reception
Output transmission
Hypothesis generation
Auto-calibration and error definitions
Register with the cubelet catalog in edge and cloud
Examples of cubelets can include:
Trained model
Computational sandbox
Execution engine
Protocol translator
Adapter In summary, the communication diagram below expresses potential interactions between the situation analyzer, smart cubes, and cubelets. The smart cubes can use workload classification and characterization techniques, such as the following, for fabricating the smart cubes:

Principal Component Analysis [PCA]
Averaging
Single
Parameter histograms
Markov models Clustering The adaptive edge framework can use workload classification and characterization techniques to refine the required cubelets from a catalog of cubelets in the edge/cloud. In some embodiments, any desired IoT platform can be used to select a cubelet using the following process:

Use a weighted sum of parameters to classify the cubelets.
Let xij denote the ith parameter for the jth cubelet.
IoT platform assigns weights wi's such that yj's provide the maximum discrimination among the cubelets.
The quantity yj is called the principal factor.
The factors are ordered. The first factor explains the highest percentage of the variance. Statistically:

a. The y's are linear combinations of x's:

$$y_i = \Sigma_{j=1}^{n} a_{ij} x_j$$

Here, aij is called the loading of variable xj on factor yi.

b. The y's form an orthogonal set, that is, their inner product is zero:

$$\langle y_i, y_j \rangle = \Sigma_k a_{ik} a_{kj} = 0$$

This is equivalent to stating that yi's are uncorrelated to each other.

c. The y's form an ordered set such that y1 explains the highest percentage of the variance in resource demands. This is the Key Cubelet that can be picked for the desired SDL expression that has been supplied.

A typical WCT analysis executed by the smart cube in order to pick the right cubelets for the desired situational context can look similar to the following Table 2:

TABLE 2

WCT for cubelet selection:

| Cubelet | | X1 Home Automation | X2 Building Automation | X3 Connected Aero | X4 Process Solution | X5 Turbo Tech |
|---|---|---|---|---|---|---|
| Z1 | Linear Regression Model | 1.577 | 39.17 | 0.908 | 80.7 | 32.6 |
| Z2 | Classification Model | 5.878 | 7.54 | 0.687 | 73 | 46.9 |
| Z3 | Protocol Translator | 1.632 | 3.41 | 0.547 | 64.7 | 36.8 |
| Z4 | Data Optimizer | 1.48 | 19.84 | 0.755 | 65.5 | 39.9 |
| Z5 | Weather Model | 0.223 | 56.69 | 0.866 | 80 | 42.5 |
| Z6 | Mean arrival Calc | 14.527 | 46.86 | 0.91 | 78.3 | 40.8 |
| Z7 | Security Analyzer | 5.05 | 9.001 | 0.06 | 0.05 | 50.05 |

An example algorithm of the adaptive edge platform architecture can be as follows, which involves using the above-mentioned architectural aspects:

1. IoT edge situation analyzer builds a context object based upon a situation analysis
2. edge management agent discovers what is available through an edge manager in cloud/edge node
3. Base smart cube image becomes available in the IoT edge layer
4. Context object is sent across to the smart cube for fabrication
5. Smart cube decodes the context object and builds the IoT domain language, e.g., SDL (Sentience Domain Language) expression
6. Smart cube audits the edge catalog over the inventory of cubelets available in the edge and cloud
7. Smart cube has the ability to download cubelets on demand
8. Edge management agent updates the context model
9. IoT platform bus attaches to smart cube published to topics of interest
10. Cubelets are able to perform inbuilt function f(x) on subscribed data
11. Cubelets are able to publish data into analytics bus [such as by using a publisher/subscriber model or modular pipe architecture]
12. Interested client modules can listen on the analytics bus [such as attach cloud connector to bus or listen to published topics]
13. Interested client modules can say "Send Data to Cloud"

The following table summarizes some issues that occur in typical IIoT edge nodes and how each issue is addressed by the disclosed systems and methods.

TABLE 3

IIoT edge node Issues, Solutions, and Uniqueness

| | Issue | Solution | Uniqueness |
|---|---|---|---|
| 1 | The analytics algorithm in the edge node is fixed, i.e., not tied to demand or input volume | Context is defined with the help of a Situational Analyzer | Edge node checks the context to determine the environment it is operating in |
| 2 | Limited intelligence about the data pattern. Algorithm cannot scale as the data volume grows. | Smart cube(s) and cubelets are downloaded from the cloud dynamically depending upon data pattern seen | Smart cube with cubelets |
| 3 | Analytics are tightly coupled to run-time environment. If configuration changes, it results into downtime. | Can adapt to the run-time environment | Context, situation analyzer, smart cube, dynamic selection of cubelets |
| 4 | The rules that the rules engine refers to are outdated. | Dynamic updates can be received | Node manager and agent, automatic downloading of cubelets |
| 5 | Analytics algorithm is determined manually based on the size of the node (e.g., tiny, small, large) | Automatic determination of which algorithm to use | The situation analyzer determines the size of the node (i.e., tiny, small, large) and selects the appropriate cubelet |

Example 1

An edge node is set up on a manufacturing shop floor to run simple stream analytics for handling real-time data that is generated by a machine. Two months after operating with that configuration, it is decided that a video camera should be added to inspect the parts that get fed into the machine. The video camera will send data that needs to be analyzed, but the firmware in the edge node does not have a visual recognition algorithm. A new firmware file needs to be prepared and downloaded into the edge node, which will require manual effort and down-time. The adaptive system and method according to this disclosure reduces manual effort and down-time such that the edge node can get the functionality it needs to analyze input data from the video camera.

Example 2

An edge node is set up in an aircraft to analyze sensor data. A model is in place to analyze data, which is expected to arrive at a known constant frequency of one data sample every 2 seconds. For about a week, the sensor generates a data sample every 2 seconds. Then, after a week, the sensor data pattern changes, and the inter-arrival time becomes irregular and the inter-sample interval is no longer fixed to 2 seconds. However, the same statistical computations are done using a model that assumed data arriving at a fixed rate. This does not show a true picture of the sensor data to a user. This problem could be solved by the adaptive system and method according to this disclosure in that the edge node could automatically detect the change in the traffic pattern and adapt to a different statistical processing model so that a true picture of the incoming data will be presented to the user.

Below are some potential advantages of transforming the IIoT edge layer into a situation aware and adaptive solution (of course, the actual advantages can depend on the implementation):

Smart cubes and cubelets become standard components that can be distributed and used across different hardware and software platforms to solve a variety of issues related to dynamic contexts.

Runtime deployment management makes the edge layer more lightweight so that the components will be downloaded only based upon the demand response. Security audit components can be downloaded only when needed, which creates new opportunities in the security name space where situation awareness provides additional dimensions for approaching threats in real time.

Reduction in edge/gateway hardware resource costs since the CPU/memory demands are reduced because the components are consumed only on demand.

Adaptive edge provides support for a new set of instrumentation features such as on demand performance monitors, watchdogs, and loggers to enable remote diagnostics and servicing of the systems.

Dynamic application build-out allows analytics applications to be downloaded as needed. This does not require manual intervention. This eliminates downtime and travel cost.

As a new device type is connected, a cubelet that can work with that device can be downloaded. This "just in time" approach makes the system responsive to change and improves user satisfaction.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of configuring an Industrial Internet of Things (IIOT) edge node, the method comprising:
    receiving, by the IIOT edge node, data from at least one device;
    determining, by the IIOT edge node, that the IIOT edge node lacks a capability to process the received data;
    performing, by the IIOT edge node, a situation analysis of the received data to determine a characteristic of the received data;
    identifying, by the IIOT edge node, based on the determined characteristic of the received data, a property of a functional module configured to process the received data, wherein the functional module is one of a plurality of available functional modules;
    automatically receiving the functional module by the IIOT edge node, based on the identified property;
    processing the received data using the functional module; and
    outputting the processed data to a bus.

2. The method of claim 1, wherein the situation analysis uses a regular expression to understand a local context, wherein the regular expression uses a matrix representation to denote a situational context of the edge node.

3. The method of claim 2, wherein the regular expression is formed through a process comprising:
    perception of data and elements of an environment derived from a context object;
    comprehension of meaning and significance of the context object; and
    projection of states and derivation of the regular expression.

4. The method of claim 2, wherein the regular expression comprises tuples of data related to Domain Context, Asset Model, Ontology Information, and Super System information related to the process industry.

5. The method of claim 2, further comprising:
    fabricating or selecting the functional module using the regular expression and using workload classification and characterization techniques comprising at least one of: Principal Component Analysis (PCA), averaging, single parameter histograms, Markov models, and clustering over a mathematical selection.

6. The method of claim 3, wherein adaptive synchronization of analytics components of the edge node allocates resources based upon the context expressed in the regular expression using workload classification techniques.

7. The method of claim 3, wherein an index of a list of functional modules present in the edge node is synchronized using one or more predetermined methods with an index of functional modules available in a network against various contexts.

8. The method of claim 3, further comprising:
    requesting, by the edge node, one or more functional modules from a network based on the local context;
    building, at the edge node, the local context as a result of device discovery, the context described using the regular expression;
    reading, by a fabricator, the local context and a directory of assets available in the network; and
    requesting, by the fabricator, that a Container Management Service send an appropriate container and a set of components to the edge node, so as to enable the edge node to dynamically load one or more components of the set of components.

9. The method of claim 1, wherein the situation analysis uses one or more regular expressions.

10. The method of claim 1, wherein the IIOT edge node is configured to execute command and control applications, stream and batch analytics, and send device-generated telemetry data to one or more devices in a network.

11. The method of claim 1, further comprising:
determining that the IIOT edge node lacks functionality to process the received data, due to a change in a sensor data collection schedule.

12. The method of claim 1, further comprising:
determining that the IIOT edge node lacks functionality to process the received data, due to operation of new equipment communicatively coupled to the IIOT edge node.

13. A system for configuring an Industrial Internet of Things (IIOT) edge node in an IIOT network, the system comprising an IIOT edge node configured to:
receive data from at least one device;
determine that the IIOT edge node lacks a capability to process the received data;
perform a situation analysis of the received data to determine a characteristic of the received data;
identify, based on the determined characteristic of the received data, a property of a functional module selected to process the received data, wherein the selected functional module is one of a plurality of available functional modules stored on the network;
automatically receive from the server the functional module, based on the identified property;
process the received data using the functional module; and
output the processed data to a bus.

14. The method of claim 13, wherein the situation analysis uses a regular expression to understand a local context, wherein the regular expression uses a matrix representation to denote a situational context of the edge node.

15. The system of claim 14, wherein the regular expression is formed through a process comprising:
perception of data and elements of an environment derived from a context object;
comprehension of meaning and significance of the context object; and
projection of states and derivation of the regular expression.

16. The system of claim 14, wherein the regular expression comprises tuples of data related to Domain Context, Asset Model, Ontology Information, and Super System information related to the process industry.

17. The system of claim 14, the functions performed further comprising:
fabricating or selecting the new or updated functional module and one or more components using the regular expression using workload classification and characterization techniques comprising at least one of: Principal Component Analysis (PCA), averaging, single parameter histograms, Markov models, and clustering over a mathematical selection.

18. A non-transitory computer readable medium containing instructions for configuring an Industrial Internet of Things (IIOT) edge node in an IIOT network to perform one or more functions, the functions comprising:
receiving, by the IIOT edge node, data from at least one device;
determining, by the IIOT edge node, that the IIOT edge node lacks a capability to process the received data;
performing, by the IIOT edge node, a situation analysis of the received data to determine a characteristic of the received data;
identifying, by the IIOT edge node, based on the determined characteristic of the received data, a property of a functional module configured to process the received data, wherein the functional module is one of a plurality of available functional modules;
automatically receiving the functional module by the IIOT edge node, based on the identified property;
processing the received data using the functional module; and
outputting the processed data to a bus.

19. The method of claim 18, wherein the situation analysis uses a regular expression to understand a local context, wherein the regular expression uses a matrix representation to denote a situational context of the edge node.

20. The method of claim 19, wherein the regular expression is formed through a process comprising:
perception of data and elements of an environment derived from a context object;
comprehension of meaning and significance of the context object; and
projection of states and derivation of the regular expression.

* * * * *